United States Patent [19]

Hoffman et al.

[11] Patent Number: 4,910,409

[45] Date of Patent: Mar. 20, 1990

[54] EARTH RADIATION ARRAY SENSING SYSTEM

[75] Inventors: James W. Hoffman, 638 Santa Alicia, Solana Beach, Calif. 92075; Ronald C. Grush, Steamboat Springs, Colo.

[73] Assignee: James W. Hoffman, Solana Beach, Calif.

[21] Appl. No.: 268,225

[22] Filed: Nov. 7, 1988

[51] Int. Cl.⁴ .............................................. G01J 5/24
[52] U.S. Cl. ..................................... 250/526; 250/349; 374/32
[58] Field of Search ................... 250/526, 336.1, 338.1, 250/349, 216; 356/43; 374/32, 33

[56] References Cited

U.S. PATENT DOCUMENTS

| | | | |
|---|---|---|---|
| 2,601,508 | 6/1952 | Fastie | 356/43 |
| 3,474,249 | 10/1969 | Cussen et al. | 374/32 |
| 4,223,264 | 9/1980 | Yamamura et al. | 374/33 |
| 4,636,091 | 1/1987 | Pompei et al. | 356/43 |
| 4,853,538 | 8/1989 | Jackson | 250/349 |

FOREIGN PATENT DOCUMENTS 0148927  9/1983  Japan ................................ 250/349

Primary Examiner—Janice A. Howell
Assistant Examiner—Richard Hanig
Attorney, Agent, or Firm—Allen A. Dicke, Jr.

[57] ABSTRACT

A sensing cavity is directed towards the radiation to be measured. An identical reference cavity is directed towards a heat sink which is maintained at a constant temperature. An electric heater and a temperature sensor are mounted on both the sensing cavity and the reference cavity. The temperature sensors are connected to a bridge which is powered only when an observation is made. The heater on the sensing cavity is controlled by bridge imbalance to equalize the temperature of the two cavities. The heater power is then a direct measure of the difference in the power entering the sensing cavity and the power entering the reference cavity. By knowing the power entering the reference cavity, the power entering the sensing cavity can be calculated. The two cavities are mounted together to a common heat sink and have a directly associated preamplifier circuit included in the modular mounting. A plurality of such sensors is used to obtain radiance measurements in many directions simultaneously.

22 Claims, 2 Drawing Sheets

EARTH RADIATION ARRAY SENSING SYSTEM

This invention was made under National Aeronautics and Space Administration Contract No. NAS5-30090SBIR-II-1988. The National Aeronautics and Space Administration has a non-exclusive, non-transferable, irrevocable, paid-up license to practice or have practiced for or on behalf of the United States the subject matter of this invention.

FIELD OF THE INVENTION

This invention is directed to an active cavity array sensing system which is particularly useful for measuring total radiation and is particularly useful for the mounting of individual sensors in an array for measuring total radiance at multiple angles over a mosaic ground pattern.

BACKGROUND OF THE INVENTION

Present and future climate research programs require the accurate measurement of total radiation from precise partial earth area footprints as well as total earth viewing measurements. Earth footprints, smaller than the total earth, are of precise angular measurements and are required to develop angular distribution models of reflected and emitted earth radiation. Present climate sensor research programs have contained mechanically scanning sensors which have a sensing angle less than the entire earth angle. These scanning sensors obtain radiation from smaller footprints, as they are scanned on the earth. The mechanical scanning of the sensors has introduced complexities in obtaining, calibrating, and analyzing the radiation measurements.

One problem is that the mechanical sensors require torquers, encoders, and other mechanical component which have a limited life. One mechanically scanned sensor failed after less than twenty months of operation. Future climate research programs will require long-term measurements to be made up to one solar cycle of eleven years. To meet these needs, it is necessary to build a sensor which will operate for up to eleven years, and this obviates the employment of mechanical scanning parts.

When a single scanner is employed on an orbiting satellite, it is normally mechanically scanned in the cross-track direction. The data which is produced is in a direction determined by the spacecraft orbital inclination and not the optimum direction for determining equator-to-pole variations and other angular distributions of interest. The field-of-view pattern on the earth generated by mechanical scanning of the sensor is dictated by the earth curvature and view angle. It would be more desirable to select the field-of-view pattern in each direction which best fits the angular radiation portions of the mathematical models. This can be better accomplished by means of a mosaic array of sensor footprints of the selected field-of-view pattern.

Another problem which arises with the mechanical scanning of a single sensor is that the field-of-view of the scanner must be small if it is to provide reasonable spatial resolution towards the edge of the earth, at low earth angles. This high resolution means a small field-of-view and a high sensitivity requirement. The spatial resolution at nadir is higher than necessary, and the field-of-view at nadir is smaller than necessary for nadir measurements. The high spatial resolution towards the edge of the earth requires a sensor which is of greater sensitivity than the presently available cavity type detectors. Accordingly, for these needs, non-cavity type detectors with optical telescopes are required to produce sufficient gain to give the required instrument precision. Such detectors and optical telescopes have spectral characteristics that prevent them from having a flat response to radiation from the ultraviolet to the far infrared. With the filtering effect of such non-cavity detectors, the spectral responses are difficult to measure and impossible to eliminate completely from the data. Such telescopes also introduce undesirable polarization effects which cannot be eliminated from the resultant measurements. A cavity-type detector with sufficient sensitivity to produce the required precision when viewing a high resolution footprint at or on the earth is required.

SUMMARY OF THE INVENTION

In order to aid in the understanding of this invention, it can be stated in essentially summary form that it is directed to an active cavity array sensing system wherein a primary observing cavity is mounted with a reference cavity in a module which employs a common heat sink. A plurality of such modules may be mounted together to be directed through a common aperture so each defines a footprint on the surface to be observed. A bridge corresponding to each module is powered only when observation is made with that detector. The modules are successively activated and sampled for radiation measurements.

It is thus an object and advantage of this invention to provide an active cavity array sensing system wherein many modules, each containing a primary cavity and a reference cavity, are mounted together for defining different sensed footprint areas, together with powering of the bridges measuring comparative cavity temperatures only when a radiation measurement is made.

It is another object and advantage of this invention to provide an active cavity array sensing system with enhanced sensitivity so that a cavity sensing system can be employed to measure earth radiation on smaller footprints than the entire earth and produce a grid of measurements on the earth.

It is another object and advantage of this invention to employ an active cavity array sensing system wherein a plurality of sensing arrays has each array directed in such a manner as to cover different footprints on the earth's surface.

It is a further object and advantage of this invention to provide an active cavity sensor module which has at least its preamplifier electronics directly associated therewith so that the active cavity sensor can be handled as a module and a plurality of them can be mounted adjacent each other to receive radiation through the same aperture at different angles.

Other objects and advantages of this invention will become apparent from a study of the following portion of the specification, the claims and the attached drawings.

DESCRIPTION OF THE PREFERRED EMBODIMENTS

Figure 1:
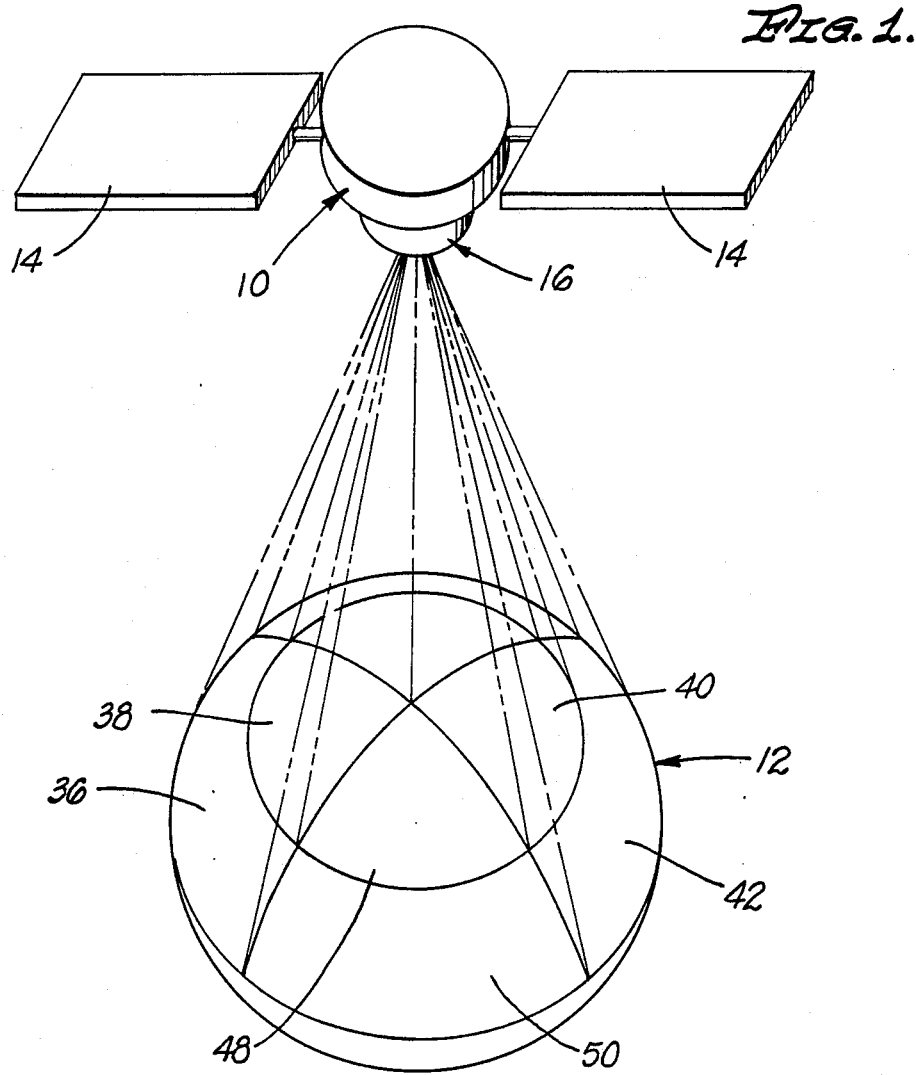
FIG. 1 is a perspective view of the active cavity array sensing system of this invention mounted in an earth-orbiting satellite showing the system in relationship to the earth and showing the footprint of the fields of view of various cavities projected on the earth.

A particular utility of the active cavity array sensing system of this invention is to view the broadband radiation from the entire earth and/or particular portions of the earth's surface. The active cavity array sensing system is shown in such an environment in FIG. 1, although it is clear that the system can be employed for other purposes. As seen in FIG. 1, satellite 10 orbits earth 12. By orbiting the earth, the entire hemisphere facing the satellite can be viewed. Satellite 10 carries solar panels 14 thereon to power the active cavity array 16 and other electrical needs on the satellite.

Figure 2:
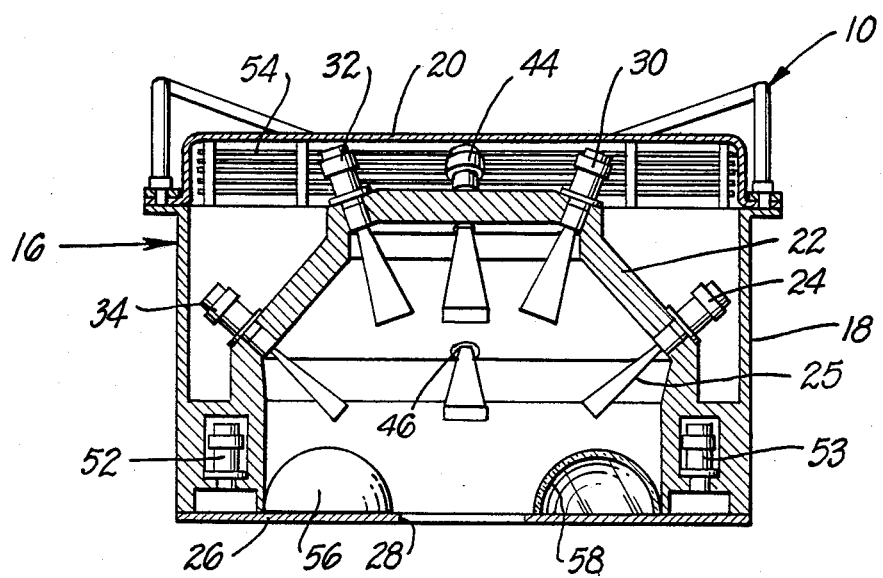
FIG. 2 is a substantially central transverse section through a preferred embodiment of the earth radiation cavity array of this invention.

A portion of the framework of satellite 10 is seen in FIG. 2, and array 16 is shown as mounted on that framework. The framework is preferably of thermal isolation nature so as to isolate the array 16 from thermal effects of the balance of the satellite. Housing 18 has a cover 20 to define the exterior structure of the array. Within the housing, support frame 22 serves to support a plurality of radiometer sensors. Support frame 22 also serves as a thermal connection between the several radiometer sensors to provide a common thermal reference and heat sink as well as to provide for the mechanical support of the several radiometer sensors. The housing 16 may be equipped for management of the temperature of the support frame 22 by control of its radiation to space. Front cover 26 has an aperture 28 in the center. As is seen in FIG. 1, eight footprint areas are defined on the earth's surface or at the top of the earth's atmosphere. Eight corresponding sensors are mounted on the support frame 22. Sensors 24, 30, 32, and 34 are each directed at the aperture 28 and lie substantially in the section plane These sensors respectively see footprint areas 36, 38, 40 and 42 on the earth or top of the atmosphere. The view or footprint as seen by the sensor is controlled by apertures and baffles mounted upon the front of each sensor. The apertures and baffles are each tailored to the particular desired footprint. Sensors 44 and 46 are beyond the section plane in FIG. 2 and respectively view footprint areas 48 and 50. These are sensors similar to sensors 44 and 46 on the near side of the section plane in FIG. 2, and these sensors view the other two footprint areas on the earth. A preferred embodiment may include 100 to 300 sensors or more, as desired. For some purposes, it is desirable to measure the total radiation from the entire earth. For this reason, sensors 52 and 53 are mounted towards the outside of support structure 22 and are downwardly directed, each through its own aperture, which permits the sensor to receive total earth radiation.

Figure 4:
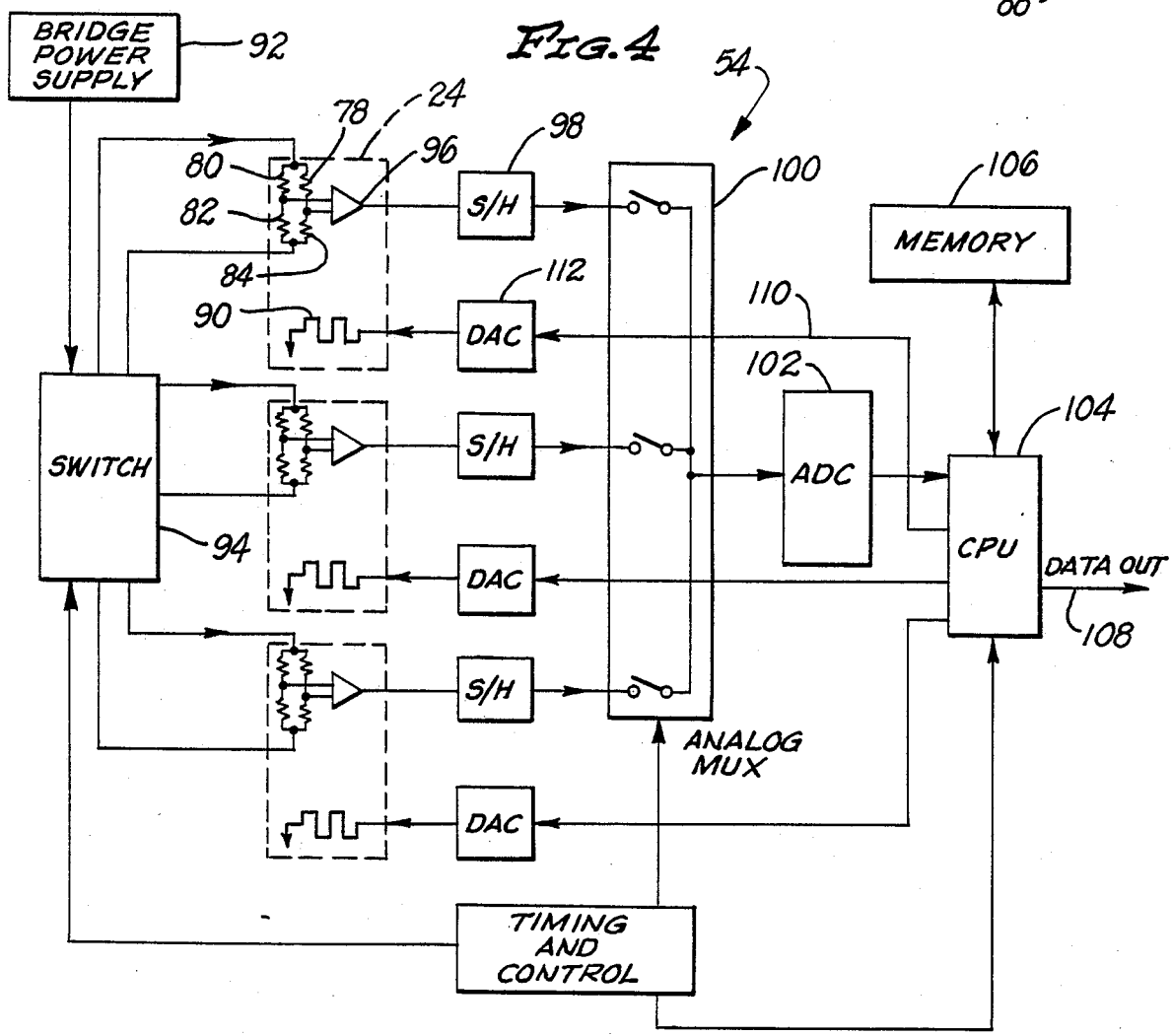
FIG. 4 is a schematic electrical diagram showing the relationship between the various components.

The array 16 also includes within the housing signal processing electronics 54, which is also generally indicated in FIG. 4. The housing also contains shutter 56, see FIG. 2, which is hemispherical and specular reflecting to serve as a calibration source. All of the radiometers which view through aperture 28 are directed at the shutter 56 when the shutter is closed. Since they each see their on internal radiation, the mirror provides a self image for calibration. Alternatively, spectral filter 58 can be moved over the aperture 28 to filter out long-wave radiation to provide short-wave measurements. With a spherically domed filter, each sensor will view the earth through a constant thickness of filter material. A quartz filter is suitable for this wavelength limitation. The shutter 56 and filter 58 each is individually motor-driven so as to be selectively moved across the aperture 28 on demand.

Figure 3:
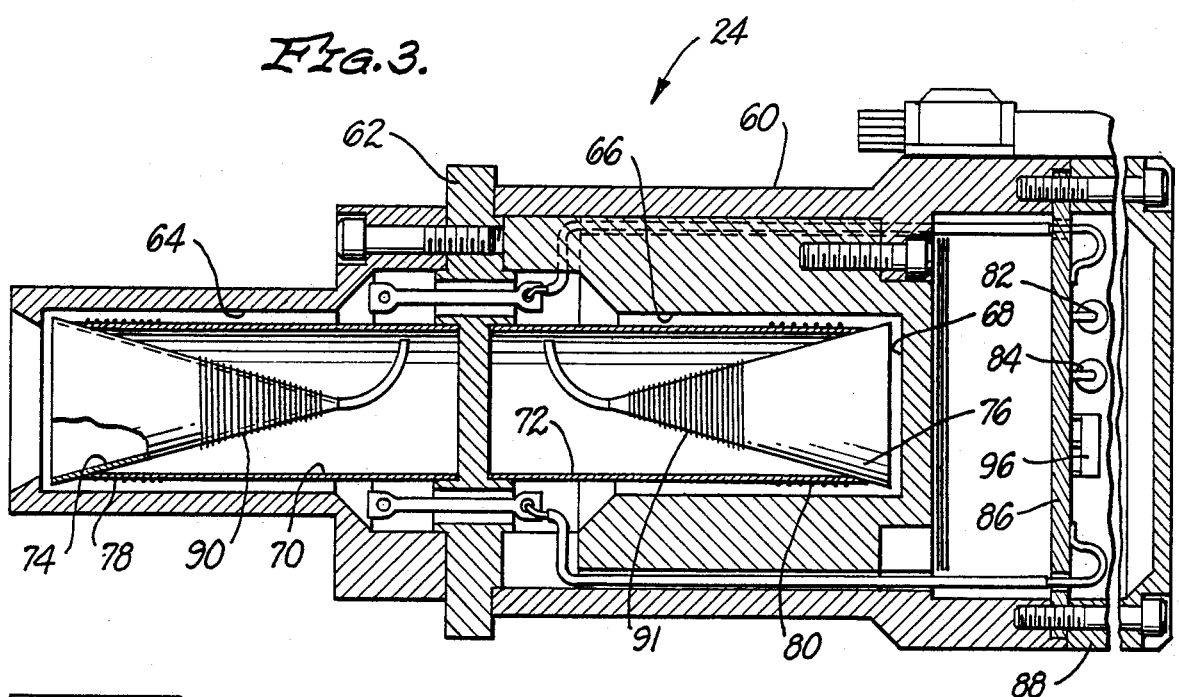
FIG. 3 is a substantially central longitudinal section through one of the modules containing a sensing cavity, a reference cavity, heater windings on the cavities, and the integral preamplifier electronics.

Each of the radiometer sensors 24, 30, 32, 34, 44, 46, 52 and 53 is mounted on the common support frame 22 which serves as the heat sink to provide thermal stability. Each of the sensors is identical, but each has its own aperture-limiting and defining baffles on the front, such as baffle 25 on sensor 24. As a particular example sensor 24 is shown in detail in FIG. 3. It is an active cavity radiometer sensor and is the same as the other sensors in the array. As seen in FIG. 3, sensor body 60 is tubular and heavy and has a copper flange 62 thereon for attachment to support frame 22 for both physical mounting of the sensor 24 and for thermal connection to the heat sink of frame 22. Chamber 64 extends from the sensing end of sensor 24 to flange 62, and chamber 66 extends from the flange to the back wall 68. The chamber walls serve as a radiation shield. Mounting tube 70 is mounted on the flange and extends forward in chamber 64, while a similar mounting tube 72 is mounted on the rear face of flange 62 and extends towards back wall 68. Sensor cone 74 is mounted in the front of tube 70 and reference cone 76 is mounted in tube 72 to face back wall 68. The sensor and reference structures are identical and simply are mounted on opposite sides of flange 62 and face in opposite directions. The inside of both cavities is painted with a specular black paint so that the conical cavity receives and absorbs all incoming radiation by means of multiple bounces and absorptions. The radiation entering sensor cone 74 is converted to heat to raise the temperature thereof. The ends of the sensor cone and reference cone are turned so that all radiation is trapped and converted to heat. Reference cone 76 receives radiation from the back wall 68 which is at heat-sink temperature and thus serves as a reference. Heat in the cones travels to the junction with the mounting tubes and from the mounting tubes to flange 62. The cone and mounting tube structures are thin-walled so as to minimize thermal mass and maximize temperature rise as a result of incoming radiation.

Temperature is measured by means of temperature sensing windings and a bridge circuit. Sensor windings 78 and 80 are windings of a wire which has a high thermal coefficient of resistance. Nickel is a suitable wire material. The sensor windings are connected into a bridge which also has resistors 82 and 84 therein. As seen in FIG. 3, the resistors and other circuitry are mounted upon a printed circuitboard 86 which is mounted in a chamber in the top of the sensor. A heavy cover 88 over the chamber maintains the electronics on printed circuitboard 86 close to heat sink temperature. Rather than measure the difference in resistance between the two sensor windings 78 and 80, it is more accurate to put an offset voltage bias in the bridges and always apply heat to the sensing cone heater winding to balance the bridge. For this reason, heater winding 90 is wound on the sensing cone 74. A similar winding 91 is wound on the reference cone 76, but only to equalize the thermal mass.

The dashed line in FIG. 4 represents the electronics on the detector 24. The power is supplied to the resistor bridge from supply 92 through switch 94. The switch is on only long enough to stabilize and take a reading. Preamplifier 96 is on printed circuitboard 86 and emits a signal to sample/hold circuit 98. The output of the sample/hold circuit goes through multiplexer 100 to analog-to-digital conversion circuit 102. The digital output goes to central processing unit 104, which processes the digital information. The central processing unit 104 implements the digital control equations to null out the error signal from the bridge and compensate for the long thermal time constants in the detector and speed up the overall response of the detector. It also provides the desired closed loop stability and transient response to a given input of radiation into the detector. Memory 106 is associated with the central processing unit to store the control equations, constants, and data. The data rate is sufficiently low that data can be processed on board by means of the microprocessor unit 104 and stored until it is convenient to read out the data to a tape recorder on the satellite or a ground station. The central processing unit 104 generates a heater voltage signal in line 110. The heater signal passes through digital-to-analog converter 112 and thence to heater 90. The heater 90 is energized continuously by holding the last determined voltage. Switch 94 and multiplexer 100 need not be operated at the same rate, but may be if desired. If they are operated at the same rate, the sample/hold circuit 98 may not be necessary. The two wide field-of-view sensors 52 and 53 are also connected into the same circuitry. While three circuit examples are shown in FIG. 4, it is understood that only three are necessary to illustrate the manner in which switching and multiplexing interact with the central processing unit. There are enough circuits in the signal processing electronics 54 so that there is a bridge, heater, preamplifier, and DAC for each sensor.

For a successful sensor, the most critical parameter is the sensitivity of the detectors. In the mosaic type of sensor described herein, to maintain high resolution over a substantial portion of the earth, small field-of-view detectors must be used. These detectors see a small signal level, and any fixed noise sources in the detector result in a reduced signal-to-noise ratio for reduced sensor precision. Temperature offset drift of the two reference resistors 82 and 84 in the bridge and temperature shift in the preamplifier operational amplifier 96 could produce degradation of the desired signal. For this reason, those components are incorporated into the sensor structure and are protected by the sensor body as a heat sink. To relate the sensor performance to earth radiance values, the sensor precision must be divided by the detector responsivity. The detector responsivity is a function of the cavity, thermal impedance (mounting tube) and bridge parameters.

An increase in the bridge bias voltage, supplied by power supply 92, increases detector responsivity. It is seen that the sensor windings 78 and 80 do not have a substantial power dissipation capability, and it would degrade sensor performance to add significant heat at these sensor coils. For this reason, the switch 94 applies current through the sensor coils and the other parts of the bridge only when that particular sensor is interrogated. The switching on of the bridge power supply only substantially when the sensor is being employed for observation is critical to increase detector responsivity by employing higher bridge voltage. The fact that the power supply to the bridge is switched on only for reading does not imply that the heater 90 is energized only at this time. The central processing unit supplies the heater 90 constantly with power at the rate last called for to provide the bridge balance. Bridge power supply switching provides updated bridge balance conditions through preamplifier 96 and to sample-hold circuit 98. This updated information is multiplexed to the central processing unit. The amount of heat supplied by the heater 90 thus correspond to difference in the amount of incoming energy received by the sensor cone and the reference cone and thus represents the data output signal.

This invention has been described in its presently contemplated best modes, and it is clear that it is susceptible to numerous modifications, modes and embodiments within the ability of those skilled in the art and without the exercise of the inventive faculty. Accordingly, the scope of this invention is defined by the scope of the following claims.

What is claimed is:

1. An active cavity array sensing system comprising:
    a support frame forming a heat sink;
    an enclosure substantially covering the front of said support frame, an aperture in said enclosure;
    a plurality of active cavity sensors mounted on said heat sink as a common heat sink for said active cavity sensors, said sensors being directed to receive radiation through said aperture;
    each of said active cavity sensors including a mounting flange for mounting said active cavity sensor on said support frame, an active cavity support tube and a reference cavity support tube mounted on said flange, an active cavity mounted on said active cavity support tube and a reference cavity mounted on said reference cavity support tube, said reference cavity being directed to view a heat sink temperature and said active cavity being directed towards said aperture to receive radiation through said aperture.

2. The active cavity array sensing system of claim 1 wherein said plurality of the active cavity sensors are each directed towards a separate footprint on a surface from which the radiation is to be measured.

3. The active cavity array sensing system of claim 2 wherein field of view limiting aperture and baffle is mounted on each active cavity sensor to control the viewed outprint configuration and eliminate stray radiation.

4. The active cavity array sensing system of claim 3 wherein a first temperature sensor is mounted on said active cavity support tube and a second temperature sensor is mounted on said reference cavity support tube, said temperature sensors being connected in a bridge with first and second resistors, a bridge power supply, a switch to selectively connect said bridge power supply to said bridge so at said bridge is powered only when temperature sensing signals are desired to reduce power losses and increase bridge bias voltage to produce more sensitive readings with less power dissipation.

5. The active cavity array sensing system of claim 4 wherein a heater is mounted on one of said cavities, said heater being connected to said bridge so that power is supplied to said heater until said bridge is balanced so that eater supply power is a direct function of radiation received by said active cavity so as to make the measurement independent of detector gain and increase measurement accuracy.

6. The active cavity array sensing system of claim 5 wherein said active cavity array is for mounting on a satellite capable of orbiting the earth with said aperture directed towards the earth so that the sensed array footprints are on the earth.

7. The active cavity array sensing system of claim 6 further including a spherical reflective shutter for selectively positioning over said aperture so that when said shutter is positioned over said aperture, said sensors are directed at said shutter, said shutter having a reflective surface directed towards each of said sensors so as to provide a reflective reference for calibrating each of said sensors.

8. The active cavity array sensing system of claim 6 further including a filter for selectively positioning over said aperture, said filter being made of a material to absorb only some of the radiation passing through said aperture so that said sensors receive radiation through said aperture so that said sensors receive radiation through said aperture on a reduced spectral bandwidth.

9. The active cavity array sensing system of claim 1 further including a spherical reflective shutter for selectively positioning over said aperture so that when said shutter is positioned over said aperture, said sensors are directed at said shutter, said shutter having a reflective surface directed towards each of said sensors so as to provide a reflective reference for calibrating each of said sensors.

10. The active cavity array sensing system of claim 1 further including a filter for selectively positioning over said aperture, said filter being made of a material to absorb only some of the radiation passing through said aperture so that said sensors receive radiation through said aperture so that said sensors receive radiation through said aperture on a reduced spectral bandwidth.

11. An active cavity sensor comprising:
a mounting flange;
an active mounting tube mounted on the first side of said mounting flange and a reference mounting tube mounted on the second side of said mounting flange;
a sensor body mounted on said mounting flange to extend beyond said flange, said sensor body having a first chamber therein for receiving said active mounting tube, said first chamber being open at its end, said sensor body having a second chamber therein for receiving said reference mounting tube, said second chamber being closed a its end away from said mounting flange;
walls defining an active cavity mounted in said active mounting tube so that said active cavity can receive radiation through the open end of said first chamber to receive radiation from outside said heat sink;
walls defining a second cavity mounted in said reference mounting tube, said reference cavity being directed towards the closed end of said second chamber so that said mounting flange and said sensor body form a heat sink toward which said reference cavity is directed to receive radiation from said heat sink.

12. An active cavity sensor in accordance with claim 11 further including a first temperature sensor thermally associated with said active cavity and a second thermal sensor thermally connected to said reference cavity, first and second resistors, a preamplifier connected to said resistors, said temperature sensors and said resistors being connected in a bridge, said first and second resistors and their corresponding preamplifier being mounted within said chamber body so that they are subjected to a heat sink environment and so as to eliminate unwanted stray capacitances and EMI effects and increases uniformity between a plurality of detectors in an array.

13. The active cavity sensor of claim 12 further including a preamplifier mounted within said sensor body so as to be located in a temperature environment controlled by the heat sink of said sensor body.

14. The active cavity sensor of claim 13 wherein said flange is configured for mounting said sensor on a heat sink in common with other similar sensors to form an active cavity sensor array.

15. The active cavity sensor of claim 13 further including a bridge power supply and a switch for connecting said bridge power supply to said bridge formed of said temperature sensors and said first and second resistors, said switch being controlled so that power is applied to said bridge substantially only when a temperature reading is required.

16. The active cavity array of claim 12 wherein there is a digital control loop connected to said bridge so as to avoid control loop changes over time.

17. The active cavity array of claim 16 wherein there is a plurality of sensors in an array and said digital control loop is connected to each of said sensors.

18. The method of sensing broadband radiation comprising the steps of:
positioning a plurality of active cavity sensors in an array so that they receive radiation at different angles through the same array aperture so that they view different footprint areas; and
sequentially sampling a signal from each active cavity array sensor corresponding to a particular radiation footprint area so that radiation from particular footprint areas can be discriminated.

19. The method of claim 18 wherein each of the sensors has an electrically powered bridge therein and further including the step of:
selectively powering each bridge only substantially for the time when a bridge signal is desired.

20. The method of claim 19 wherein each sensor has an active cavity and a reference cavity and the bridge includes a temperature sensor thermally connected to the active cavity and a temperature sensor thermally connected to the reference cavity and there is a heater connected to the reference cavity and further including the step of:
supplying electric current to the heater to substantially balance the bridge.

21. The method of claim 20 further including the step of:
subjecting each of the sensors in the array to a common heat sink and subjecting the bridge to the common heat sink so as to stabilize temperatures.

22. The method of claim 20 further including the step of:
employing a signal corresponding to heater power as an indication of incoming radiation.

* * * * *